United States Patent
Walters et al.

(10) Patent No.: US 11,741,058 B2
(45) Date of Patent: Aug. 29, 2023

(54) SYSTEMS AND METHODS FOR ARCHITECTURE EMBEDDINGS FOR EFFICIENT DYNAMIC SYNTHETIC DATA GENERATION

(71) Applicant: Capital One Services, LLC, McLean, VA (US)

(72) Inventors: Austin Walters, Savoy, IL (US); Jeremy Goodsitt, Champaign, IL (US); Anh Truong, Champaign, IL (US); Galen Rafferty, Mahomet, IL (US); Grant Eden, San Francisco, CA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 21 days.

(21) Appl. No.: 17/395,581

(22) Filed: Aug. 6, 2021

(65) Prior Publication Data
US 2023/0044378 A1    Feb. 9, 2023

(51) Int. Cl.
*G06F 16/21*    (2019.01)
*G06N 5/025*    (2023.01)
*G06F 16/2457*    (2019.01)

(52) U.S. Cl.
CPC ........ *G06F 16/21* (2019.01); *G06F 16/24575* (2019.01); *G06N 5/025* (2013.01)

(58) Field of Classification Search
CPC .... G06F 16/21; G06F 16/24575; G06N 5/025
See application file for complete search history.

(56) References Cited

U.S. PATENT DOCUMENTS

| 10,692,019 B2 | 6/2020 | Goodsitt |
| 2019/0139641 A1 | 5/2019 | Itu |
| 2019/0385064 A1 | 12/2019 | Malaya |
| 2020/0012626 A1* | 1/2020 | Walters .................. G06N 7/005 |

FOREIGN PATENT DOCUMENTS

| CN | 108711138 A | 10/2018 |
| WO | WO 2020/174459 A1 | 3/2020 |

* cited by examiner

*Primary Examiner* — Apu M Mofiz
*Assistant Examiner* — Cindy Nguyen
(74) *Attorney, Agent, or Firm* — Finnegan, Henderson, Farabow, Garrett & Dunner, LLP

(57) ABSTRACT

Systems and methods for architecture embeddings for efficient dynamic synthetic data generation are disclosed. The disclosed systems and methods may include a system for generating synthetic data configured to perform operations. The operations may include retrieving a set of rules associated with a first data profile and generating, by executing a hyperparameter search, a plurality of hyperparameter sets for generative adversarial networks (GANs) that satisfy the set of rules. The operations may include generating mappings between the hyperparameter sets and the first data profile and storing the mappings in a hyperparameter library. The operations may include receiving a request for synthetic data, the request indicating a second data profile and selecting, from the mappings in the hyperparameter library, a hyperparameter set mapped to the second data profile. The operations may include building a GAN using the selected hyperparameter set and generating, using the GAN, a synthetic data set.

20 Claims, 6 Drawing Sheets

200

| Data Profile | Hyperparameter Set | Convergence Score | Accuracy Score |
|---|---|---|---|
| A | Hyperparameter Set #1 | 6 | 8 |
| A | Hyperparameter Set #2 | 9 | 5 |
| B | Hyperparameter Set #2 | 9 | 9 |
| C | Hyperparameter Set #3 | 8 | 8 |

201 — row 1
203 — row 2
205 — row 3
207 — row 4

FIG. 2

SYSTEMS AND METHODS FOR ARCHITECTURE EMBEDDINGS FOR EFFICIENT DYNAMIC SYNTHETIC DATA GENERATION

TECHNICAL FIELD

The disclosed embodiments concern creating embeddings linking structure of data models to data profiles. These data models can be used to generate synthetic data for testing or training artificial intelligence systems, for example.

BACKGROUND

Training artificial intelligence systems may require substantial amounts of training data. Different artificial intelligence systems with different goals may also require unique types of synthetic data of varying data types or in varying formats. Furthermore, when used with data dissimilar from the training data, artificial intelligence systems may perform poorly. Proper training may require a large amount of training data to cover a variety of scenarios. In addition, training data may include sensitive portions (e.g., confidential information), the storage, transmission, and distribution of which may be regulated, making these data unavailable for training or imposing strict and cumbersome data processing requirements to protect sensitive data portions.

Existing approaches to generating synthetic data may require resource intensive, time consuming, and costly model construction. As an example, each time a model for generating synthetic data is desired, the model may need to be constructed using unknown hyperparameters, which can be a slow and expensive process. Accordingly, a need exists for systems and methods of efficiently and quickly creating synthetic data similar to existing datasets and enabling efficient future use.

SUMMARY

The disclosed embodiments describe systems and methods for architecture embeddings for efficient dynamic synthetic data generation. For example, in an exemplary embodiment, there may be a system for generating synthetic data. The system may include at least one memory storing instructions; and at least one processor configured to execute the instructions to perform operations. The operations may include retrieving a set of rules associated with a first data profile and generating, by executing a hyperparameter search, a plurality of hyperparameter sets for generative adversarial networks. The hyperparameter sets may correspond to generative adversarial networks that satisfy the set of rules. The operations may include generating first mappings between the plurality of hyperparameter sets and the first data profile and storing the first mappings in a hyperparameter library. The hyperparameter library may store a plurality of mappings of hyperparameter sets to a plurality of data profiles. The operations may include receiving a request for synthetic data, the request indicating a second data profile and selecting, from the plurality of mappings in the hyperparameter library, a hyperparameter set mapped to the second data profile. The operations may include building a generative adversarial network using the selected hyperparameter set and generating, using the generative adversarial network, a synthetic data set.

According to a disclosed embodiment, generating the plurality of hyperparameter sets may include selecting a first candidate hyperparameter set of a plurality of candidate hyperparameter sets and generating, using the first candidate hyperparameter set, a second generative adversarial network. Generating the plurality of hyperparameter sets may include determining that the second generative adversarial network satisfies the set of rules and returning the first candidate hyperparameter set based on the determination. Generating the plurality of hyperparameter sets may include selecting a second candidate hyperparameter set of the plurality of candidate hyperparameter sets and generating, using the second candidate hyperparameter set a third generative adversarial network. Generating the plurality of hyperparameter sets may include determining that the third generative adversarial network satisfies the set of rules and returning the second candidate hyperparameter set based on the determination.

According to a disclosed embodiment, mapping the plurality of hyperparameter sets to the first data profile may include mapping the first and second candidate hyperparameter sets to the first data profile.

According to a disclosed embodiment, determining that the second generative adversarial network satisfies the set of rules may include executing the second generative adversarial network multiple times to generate a plurality of synthetic data sets, comparing the plurality of synthetic data sets to the first data set, and determining an accuracy metric for the generative adversarial network based on the comparisons.

According to a disclosed embodiment, determining that the first generative adversarial network satisfies the set of rules may include determining that an accuracy metric satisfies an accuracy criterion.

According to a disclosed embodiment, the set of rules may include a convergence criterion.

According to a disclosed embodiment, determining that the second generative adversarial network satisfies the set of rules may include executing the second generative adversarial network multiple times to generate a plurality of synthetic data sets and determining a convergence metric for the generative adversarial network based on multiple executions of the generative adversarial network.

According to a disclosed embodiment, the operations may further include comparing the convergence metric to a convergence criterion and determining, based on the comparison, that the second generative adversarial network converges.

According to a disclosed embodiment, the first data profile and the second data profile may be the same data profile.

According to a disclosed embodiment, retrieving the set of rules may include accessing the first data profile.

According to a disclosed embodiment, accessing the first data profile may include generating the first data profile for a dataset and generating the set of rules associated with the first data profile.

According to another disclosed embodiment, a method may be implemented for generating synthetic data. The method may include retrieving a set of rules associated with a first data profile and generating, by executing a hyperparameter search, a plurality of hyperparameter sets for generative adversarial networks. The hyperparameter sets may correspond to generative adversarial networks that satisfy the set of rules. The method may include generating mappings between the plurality of hyperparameter sets and the first data profile and storing the mappings in a hyperparameter library. The hyperparameter library may store a plurality of mappings of hyperparameter sets to a plurality of data profiles. The method may include receiving a request for synthetic data, the request indicating a second data profile and selecting a hyperparameter set based on the second data profile and from the plurality of mappings in the hyperparameter library. The method may include building a generative adversarial network using the selected hyperparameter set and generating a synthetic data set using the generative adversarial network.

According to a disclosed embodiment, receiving a request for synthetic data may include receiving a reference dataset.

According to a disclosed embodiment, the method may include generating a profile for the reference dataset. The generated profile may include the second data profile.

According to a disclosed embodiment, selecting, based on the second data profile and from the plurality of mappings in the hyperparameter library, a hyperparameter set may include selecting a hyperparameter set mapped to the second data profile.

According to a disclosed embodiment, the method may further include determining that the second data profile is not mapped to a hyperparameter set in the hyperparameter library and identifying a third data profile similar to the second data profile. The third data profile may be mapped to a hyperparameter set in the hyperparameter library. The selected hyperparameter set may be mapped to the third data profile.

According to a disclosed embodiment, the set of rules may indicate a desired data distribution.

According to a disclosed embodiment, the hyperparameter search may include a grid search.

According to a disclosed embodiment, the hyperparameter search may include a random search.

According to another disclosed embodiment, there may be a a method may be implemented for generating synthetic data. The method may be a non-transitory computer readable medium including instructions that, when executed by at least one processor, cause the at least one processor to perform operations for generating synthetic data. The operations may include retrieving a set of rules associated with a first data profile and generating, by executing a hyperparameter search, a plurality of hyperparameter sets for generative adversarial networks. The hyperparameter sets may correspond to generative adversarial networks that satisfy the set of rules. The method may include generating mappings between the plurality of hyperparameter sets and the first data profile and storing the mappings in a hyperparameter library. The hyperparameter library may store a plurality of mappings of hyperparameter sets to a plurality of data profiles. The method may include receiving a request for synthetic data, the request including a reference data set having a characteristic and generating a second data profile based on the reference dataset. The second data profile may be the same as the first data profile. The method include selecting a hyperparameter set based on the second data profile and from the plurality of mappings in the hyperparameter library, building a generative adversarial network using the selected hyperparameter set, and generating a synthetic data set having the characteristic of the reference dataset using the generative adversarial network.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate several embodiments and, together with the description, serve to explain the principles of the disclosure. The drawings are not necessarily to scale or exhaustive. In the drawings:

FIG. 2 is an illustration depicting an exemplary hyperparameter mapping, consistent with disclosed embodiments.

DETAILED DESCRIPTION

Figure 1:
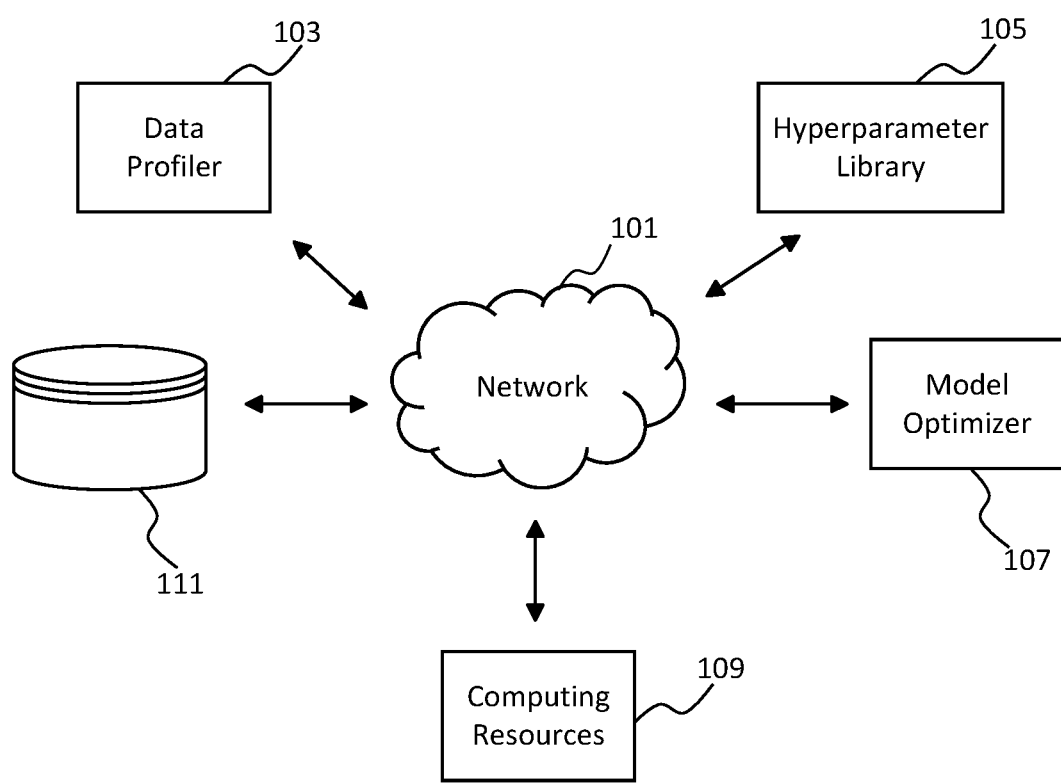
FIG. 1 is an exemplary computing environment for generating synthetic data, consistent with disclosed embodiments.

Reference will now be made in detail to exemplary embodiments, discussed with regards to the accompanying drawings. In some instances, the same reference numbers will be used throughout the drawings and the following description to refer to the same or like parts. Numerous specific details are set forth in order to provide a thorough understanding of the disclosed example embodiments. Unless otherwise defined, technical and/or scientific terms have the meaning commonly understood by one of ordinary skill in the art. The disclosed embodiments are described in sufficient detail to enable those skilled in the art to practice the disclosed embodiments.

However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently. For example, unless otherwise indicated, method steps disclosed in the figures can be rearranged, combined, or divided without departing from the envisioned embodiments. Similarly, additional steps may be added or steps may be removed without departing from the envisioned embodiments. For example, according to some embodiments, parts of processes 300, 400, and 500 in the following description may be combined (e.g., one or more steps from process 500 may be added to process 400).

Machine learning and artificial intelligence models often require large amounts of data for accurate and robust training and testing. In many cases, it may not be feasible or cost-efficient to use real data for such training purposes. Real data may also include sensitive data and thus present security risks. Instead of real data, synthetic data may be used to train and test models. This synthetic data can be generated using a synthetic dataset model, which can in turn be generated using an initial actual reference dataset or data profile.

Different models may require significantly different types of synthetic data for training purposes. Thus, for each new machine learning model needing to be trained, a separate model would need to be created for generating synthetic data to train the machine learning model. Creating a model to generate synthetic data accurately is time-consuming, costly, and computationally expensive. Disclosed embodiments implement an approach using embeddings that map model hyperparameters to data profiles to reduce costs, save time, and provide increased stability over conventional approaches.

According to disclosed embodiments, a generative adversarial network ("GAN") may be implemented for generating synthetic data. The GAN may be constructed using one or more hyperparameters that define the architecture of the GAN. Disclosed embodiments may include generating mappings (or embeddings) between sets of GAN hyperparameters and data profiles. When a user desires a synthetic data set having certain characteristics, a data profile may be created having these characteristics. The mappings may then be used to retrieve GAN hyperparameters mapped to the desired data profile. In some embodiments, clusters of data profiles may be created, and a hyperparameter set may be retrieved for a new data profile based on the clusters of similar profiles. A GAN may then be built using the retrieved hyperparameters and later used to generate synthetic data having the desired characteristics.

As described in greater detail below, disclosed embodiments may decrease the time, resources, and costs associated with generating synthetic data sets. The synthetic data may be similar to the actual data in terms of values, value distributions (e.g., univariate and multivariate statistics of the synthetic data may be similar to that of the actual data), structure and ordering, or the like. In this manner, the data model for the machine learning application can be generated without directly using the actual data. By using a mapping approach to build GANs for generating synthetic data, suitable hyperparameters may only need to be identified once for a particular data profile. Accordingly, when synthetic data having a same or similar profile is to be generated, the previously identified and mapped hyperparameters may be used to build a new model. Thus, the time and resources associated with identifying hyperparameters, building models, testing models, and evaluating models to determine if they are suitable for generating synthetic datasets having a certain profile.

Reference will now be made in detail to the disclosed embodiments, examples of which are illustrated in the accompanying drawings.

FIG. 1 is an exemplary computing environment 100 for implementing modular generators, consistent with disclosed embodiments. Environment 100 can be configured to support generation and storage of synthetic data, as well as generation and storage of modular data models. Environment 100 can be configured to expose an interface for communication with other systems. Environment 100 can include a network 101, data profiler 103, a hyperparameter library 105, a model optimizer 107, computing resources 109, and a storage device 111 as shown in FIG. 1. The particular arrangement of components depicted in FIG. 1 is not intended to be limiting. Environment 100 can include additional components, or fewer components. Multiple components of environment 100 can be implemented using the same physical computing or storage device or different physical computing or storage devices.

Components of environment 100 can be configured to communicate with each other, or with external components of environment 100, using network 101. Network 101 can facilitate communications between the other components of environment 100. Network 101 can include one or more networks, including a TCP/IP network (e.g., the Internet), a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications network (e.g., a Bluetooth link, an infrared link, etc.), or another type of communications network. The disclosed embodiments are not limited to embodiments in which communications between components of environment 100 occur over a particular type of network. Furthermore, the disclosed embodiments are not limited to communication through a network. In some embodiments, components of environment 100 may additionally or alternatively communicate between each other directly.

Data profiler 103 can include one or more computing devices configurable to profile a dataset. In some embodiments, data profiler 103 may be a software program for profiling datasets executed by, for example, computing resource 109. As used herein, a data profile may define the structure of a dataset. A data profile may include a variety of information such as a data type (e.g., integer, floating-point number, string, Boolean, etc.). A data profile may also indicate a content type of the data within a dataset, for example, whether the data represents text (e.g., words, sentences, a document, email or other written communication, phone number, address, name, article, or the like), images, sounds (e.g., speech, music, or other types of audio), video, etc. A data profile may include a size of the dataset, a number of rows or columns, an amount of data or data entries within the dataset or other size related characteristics. Additionally, or alternatively, a data profile may include statistics related to the dataset, such as a minimum value, maximum value, average, sum, count, value patterns, value distributions, or others. A data profile may indicate other characteristics of a dataset, such as whether the dataset conforms to certain standards or a set of rules, keywords related to the dataset, a summary of the data, or other information about the dataset.

A data profile may include a set of rules associated with the corresponding data set. A set of rules may indicate various characteristics that a data set may need or criteria that a data set must meet in order for the data set to fall within the profile. Rules may indicate required data distributions, minimum or maximum values for data set statistics, a data type, a content type, format, or other requirements. As an example, rules may indicate that the data set includes emails having a minimum and a maximum length. As another example, the rules may indicate that the data set includes numerical data having a certain type of distribution or statistical values (e.g., mean, standard deviations, variance, quantiles, skewness, etc.) within a defined range. In some embodiments, rules may include requirements related to similarity to the original dataset. For example, the rule set may include a rule requiring that none of the rows of a synthetic data set generated using a model match the original reference dataset. As another example, a rule may require that the number or percentage of identical rows falls below a predefined threshold.

As depicted in FIG. 1, environment 100 may include a hyperparameter library 105. Hyperparameter library 105 can be a storage device configured to store hyperparameter sets and information related to data profiles. For example, as described in greater detail below, hyperparameter library 105 may store an index mapping hyperparameter sets to data profiles. Hyperparameter library 105 may also store clusters of hyperparameter mappings, as described in greater detail below, for example, with respect to FIG. 5.

As used herein, a hyperparameter set may refer to a grouping of model hyperparameters that may be used to generate a synthetic data model, such a generative adversarial network. For example, a hyperparameter set may include a group of hyperparameters for a generator of a GAN and a group of hyperparameters for a discriminator for the same GAN. Accordingly, a GAN may be constructed with two neural networks using the generator and discriminator hyperparameter groups. Hyperparameters may refer to values of machine learning models that control or influence the architecture of the model and control the learning process. Hyperparameters may include, for example, generator learning rate, discriminator learning rate, batch size, number of epochs, activation functions, number of layers, number of hidden dimensions or layers, or others. Hyperparameters may be contrasted with other model parameters that may be adjusted or tuned during training of a model, such as node weights.

Hyperparameter library 105 may be a storage device such as a database or memory local to a computing device. In some embodiments, hyperparameter library 105 may be a storage service or one or more databases configured to store data for use by components of environment 100. As an example, hyperparameter library 105 may include one or more cloud-based databases (e.g., AMAZON WEB SERVICES S3 buckets) or on-premises databases. In some embodiments, hyperparameter library 105 may be local memory or other storage local to one or more of computing resources 109.

Environment 100 may further include a model optimizer 107. Model optimizer 107 may be one or more computing devices configured to generate hyperparameter sets for GAN models. For example, as described in greater detail below, model optimizer may execute one or more steps of processes 300 or 400 of FIGS. 3 and 4. Accordingly, model optimizer 107 may be configured to perform hyperparameter searches, generate models, train models, and evaluate models. Model optimizer may also be configured to Model optimizer 107 may be in communication with hyperparameter library 105. For example, model optimizer 107 may send mappings of hyperparameter sets to data profiles to hyperparameter library 105 for storage. In some embodiments, model optimizer may be a software program executed by computing resources 109. Model optimizer 107 may also take the form of one or more virtualized or container instances within a cloud computing platform (e.g., one or more AMAZON LAMBDA instances or other containerized instances).

As shown in FIG. 1, environment 100 may include one or more computing resources 109. Computing resources 109 can include one or more computing devices configurable to execute data models to generate synthetic data. For example, computing resources 109 may be configured to execute one or more steps of process 500 depicted by FIG. 5. As described herein, computing resources 109 may also be configured to execute software for generating hyperparameter sets, profiling datasets, and mapping data profiles to hyperparameter sets, consistent with, for example, one or more steps of processes 300, 400, or 500. Computing resources 109 can be general-purpose computing devices such as a personal computer (e.g., a desktop, laptop, workstation, or the like); server, a cloud computing environment or a virtual machine (e.g., virtualized computer, container instance, etc.). Consistent with disclosed embodiments, computing resources 109 can be special-purpose computing devices, such as graphical processing units (GPUs), application-specific integrated circuits, a network appliance, or the like. In some embodiments, computing resources 109 may include cloud computing instances (e.g., one or more AMAZON LAMBDA instances or other containerized instances). Consistent with disclosed embodiments, computing resources 109 can be configured to host an environment for building or training data models. For example, the computing devices can host virtual machines, pods, or containers.

Computing resources 109 can be configured to run applications for generating data models. For example, the computing devices can be configured to run SAGEMAKER, GENESYS, or similar machine learning training applications. Consistent with disclosed embodiments, computing resources 109 can be configured to receive hyperparameter sets from hyperparameter library 105 and use the sets to build data models. Computing resources 109 can be configured to receive models for training or execution from, for example, storage device 111. Computing resources 109 can be configured to provide training results, including trained models and model information, such as the type or purpose of the model and any measures of classification error. Computing resources 109 can also be configured to provide results of model execution, for example, synthetic data sets generated by models.

In some embodiments, computing resources 109 may also include one or more client devices. Client devices may for example, be used to request or access synthetic data of a certain format. Client devices may also provide an interface for interacting with environment 100.

Consistent with disclosed embodiments, computing resources 109 may comprise one or more processors and one or more memories. A processor (or processors) can be one or more data or software processing devices. For example, the processor may take the form of, but is not limited to, a microprocessor, embedded processor, or the like, or may be integrated in a system on a chip (SoC). Furthermore, according to some embodiments, the processor may be a processor manufactured by Intel®, AMD®, Qualcomm®, Apple®, NVIDIA®, or the like. A processor may also be based on the ARM architecture, a mobile processor, or a graphics processing unit, etc. The disclosed embodiments are not limited to any type of processor configured in the computing resources 109. Additionally, the processor may in some embodiments execute one or more programs (or portions thereof) remotely located from the particular computing resource.

A memory (or memories) may include one or more storage devices configured to store instructions used by the processor to perform functions related to disclosed embodiments. Memory may be configured to store software instructions, such as programs, that when executed by processor, perform one or more operations consistent with disclosed embodiments. The disclosed embodiments are not limited to particular software programs or devices configured to perform dedicated tasks. For example, a memory may store a single program, such as a user-level application, or may store multiple software programs. For example, a memory may include a program for generating synthetic data, e.g., executing process 500 illustrated in FIG. 5. As another non-limiting example, a memory may store an application that may provide an interface for a user, which may facilitate access to one or more parts of environment 100. A memory may also be configured to store data associated for use by a program or data entered by a user in accordance with disclosed embodiments. In some embodiments, a memory may also include an operating system (e.g., a Windows™ operating system, Apple™ operating system, Android™ operating system, Linux operating system, a cloud-based operating system, or other types of operating systems).

As depicted in FIG. 1, environment 100 may include one or more storage devices 111. Storage device 111 can be a database, storage service, a data lake, or include one or more databases configured to store data for use by system 100. As an example, storage device 111 may include one or more cloud-based databases (e.g., AMAZON WEB SERVICES S3 buckets) or on-premises databases. In some embodiments, storage device 111 may be local memory or other storage local to one or more of computing resources 109. Storage device 111 can be configured to store information about data models, data models, generated synthetic datasets, data profiles, hyperparameter sets, or other data received from one or more components of environment 100. For example, storage device 111 can be configured to store synthetic datasets generated by computing resources 109.

FIG. 2 is an illustration depicting an exemplary hyperparameter index 200, consistent with disclosed embodiments. Hyperparameter index 200 may be stored by, for example, hyperparameter library 105. While hyperparameter index 200 is depicted as a table, hyperparameter index 200 may take a variety of suitable forms for storing and relating data. In addition to hyperparameter index 200, hyperparameter sets may be stored by hyperparameter library 105. In some embodiments, hyperparameter library 105 may reference hyperparameter sets that are stored in another location, for example, storage device 111.

Hyperparameter index 200 may map data profiles to hyperparameter sets. For example, as depicted in FIG. 2, row 201 may map data profile A to hyperparameter set #1. Similarly, row 203 may map data profile A to hyperparameter set #2. Row 205 may map a different data profile, data profile B to hyperparameter set #2. Yet another row of hyperparameter index 200, row 207, may map data profile C to hyperparameter set #3.

Additionally, hyperparameter index 200 may include information related to each of the hyperparameter set mappings. For example, hyperparameter index 200 may store information indicating the stability or convergence of a model built using the given hyperparameter set and trained to generate data having the mapped data profile. Additionally, or alternatively, hyperparameter index 200 may store information indicating an accuracy or realism level or other evaluation of a model built using the given hyperparameter set and trained to generate data having the mapped data profile. Such information may be used in conjunction with selection criteria, discussed in greater detail below, to select a hyperparameter set for a model.

A convergence metric may be a score expressing a relative likelihood of convergence of a model (i.e., relative stability of the model). Convergence scores may be expressed as a numerical score (e.g., on a scale of 1-10), a percentage, a relative level (e.g., low, medium, high), or other suitable form for comparing relative convergence of models. Convergence scores may be assigned during testing of models during, for example, the execution of a hyperparameter search, as described below.

As an example, hyperparameter set mappings may be assigned a numerical score on a scale of 1-10. A convergence score of 9 or 10 may indicate that the model built using the corresponding hyperparameter set and trained to generate synthetic data having the associated data profile always or nearly always converges. Conversely, a relatively low convergence score (e.g., 1 or 2) may indicate that the associated hyperparameters result in an unstable model that rarely converges.

As depicted in FIG. 2, hyperparameter index 200 may include accuracy metrics corresponding to hyperparameter set and data profile mappings. Additionally, or alternatively, hyperparameter index 200 may include other metrics such as realism scores or speed scores. An accuracy or similarity score may indicate a relative level of similarity of generated synthetic data generated to a real or reference dataset. A speed score may indicate the time required for a model generated with the hyperparameter set to generate a synthetic dataset of a certain size having the corresponding data profile. A speed score may also indicate a relative speed of a model, as compared to other models mapped to the same data profile. A realism score may indicate a relative level of realism of synthetic data produced by a model. In some cases, some synthetic data models may produce more realistic data content than others. Accordingly, a realism criterion may indicate a relative level of realism desired in the resulting synthetic data. In some embodiments, a realism score may relate to the generator's ability to fool the discriminator (e.g., a relative rate at which a GAN's generator fools the discriminator). Selecting hyperparameter sets based on such scores may promote more efficient synthetic data generation through finer control over requirements for the model.

Figure 3:
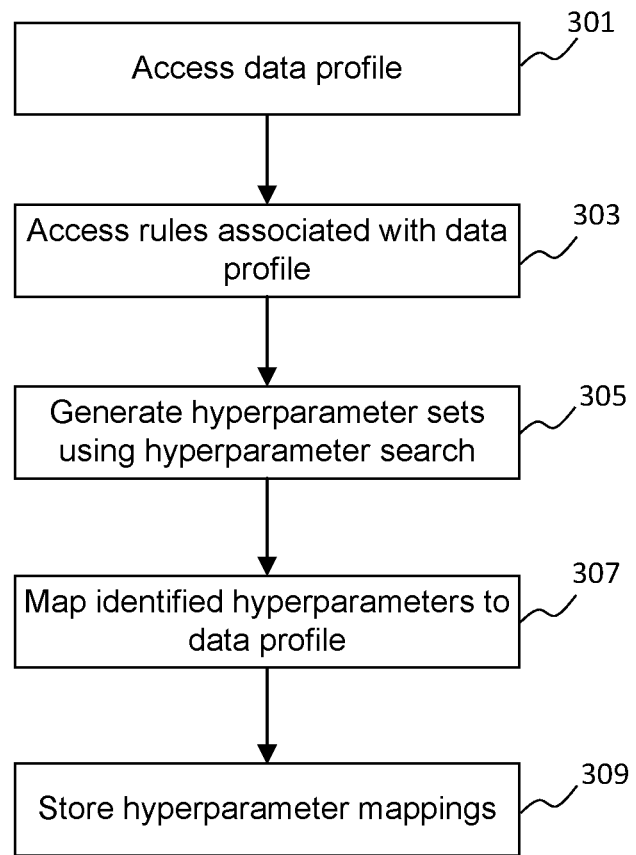
FIG. 3 is a flowchart depicting an exemplary process for generating hyperparameter mappings, consistent with disclosed embodiments.

FIG. 3 is a flowchart depicting an exemplary process 300 for generating hyperparameter mappings, consistent with disclosed embodiments. Process 300 may be executed by one or more components of environment 100. For example, process 300 may be executed model optimizer 107, in conjunction with one or more of data profiler 103, hyperparameter library 105, computing resource 109, or storage device 111. For example, model optimizer may receive a data profile from data profiler 103 or storage device 111 and store hyperparameter mappings in hyperparameter library 105, as described in greater detail below.

At step 301, process 300 may include accessing a data profile. Accessing a data profile may include receiving or retrieving an existing data profile from another computing device or storage location. For example, the data profile may be retrieved from data profiler 103 or storage device 111. In some embodiments, receiving the data profile may include receiving a request for synthetic data. The request may include a reference dataset. Accordingly, accessing the data profile may include generating a data profile of the reference set. For example, step 301 may include sending instructions to data profiler 103 to generate a data profile of the dataset. In some cases, the instructions may include the dataset. Alternatively, the instructions may include a reference to a storage location storing the dataset, for example, storage device 111. After generating the data profile, data profiler 103 may send the data profile to model optimizer 107. Data profiler 103 may also send the data profile to storage device 111 for storage.

At step 303, process 300 may include accessing rules associated with the data profile. Accessing rules may include receiving or retrieving the rules from another computing device or storage location. For example, the rules may be retrieved from storage device 111. Storage device 111 may store data profiles and associated rule sets. In some embodiments, the rules may be stored with a corresponding data profile. Accordingly, the rules may be received along with the data profile, and retrieving the set of rules may include accessing the first data profile. Thus, steps 301 and 303 may collapse into a single step. Rules associated with the data profile may also be accessed from data profiler 103. For example, data profiler 103 may be configured to generate a set rules when generating a data profile. Accordingly, data profiler may send the set of rules, along with the data profile, to model optimizer 107.

In some embodiments, step 303 may include generating rules associated with the data profile. As mentioned above, data profiler 103 may generate rules. Accordingly, accessing the first data profile may include generating the first data profile for a dataset and generating the set of rules associated with the first data profile. Additionally, or alternatively, model optimizer 107 may be configured to receive the data profile and generate a set of rules based on the profile. Sets of rules may be generated using information from the data profile. For example, rules may be based on the type of data, content data type, size of the data set, data distributions or statistics, minimum or maximum values, format, or other information related to a data profile. A set of rules may be generated such that profiling a data set adhering to the rules would result in the data profile corresponding to the set of rules.

A set of rules may also include rules related to models used to generate synthetic data adhering to the rules, and thus having the corresponding desired data profile. For example, the set of rules may include a convergence criterion. A convergence criterion may indicate, for example, a minimum number of times a model must converge out of a given number of runs. A convergence criterion may thus be used to ensure that models built for generating synthetic data according to the set of rules are stable and will generally converge. As an example, a convergence criterion may indicate that a model should converge 9 out of 10 times the model is executed (i.e., the model converges at least 90% of the time). Accordingly, a model that only converges 60% of the time would not satisfy the rules and may not be used.

At step 305, process 300 may include generating hyperparameter sets. Hyperparameter sets may be generated using a hyperparameter search. As used herein, a hyperparameter search may refer to a process of generating hyperparameters for a machine learning model. A hyperparameter search may be implemented to find a group of hyperparameters that is functional or optimal for a certain model type. For example, a hyperparameter search may generally include identifying a set of hyperparameters, generating a model using the set, training the model, and testing or validating the model. In some embodiments, testing or validating a model in a hyperparameter search may involve evaluating a loss function and selecting hyperparameters that minimize the loss function or cause the loss function to fall below a certain threshold. A hyperparameter search may include a grid search, random search, Bayesian optimization, Gradient-based optimization, or other suitable hyperparameter search technique. As an example, a grid search may include selecting hyperparameters from a predefined space of hyperparameters and testing each combination of hyperparameters within the space.

Conducting a hyperparameter search may include retrieving training data. Training data may be retrieved from a storage location, for example storage device 111. The training data may be related to the accessed data profile. In some embodiments, the training data may be stored with the data profile. The training data may be used to train and evaluate models created using candidate hyperparameter sets.

Consistent with disclosed embodiments, a hyperparameter search may return a hyperparameter set that converges and satisfies the accessed set of rules. In some embodiments, the hyperparameter search may be configured to return multiple hyperparameter sets, each of which satisfy the given set of rules or convergence criteria. For example, the hyperparameter sets may be determined through one or more steps of process 400 of FIG. 4, as described in greater detail below.

At step 307, process 300 may include mapping identified hyperparameters to a data profile. Mapping may include storing the identified hyperparameters in association with the data profile, or otherwise linking the identified hyperparameters to the data profile. Consistent with disclosed embodiments, multiple hyperparameter sets may be generated at step 305. Each of the generated hyperparameter sets may be mapped to the accessed data profile. In some embodiments, a subset of the generated hyperparameter sets may be mapped. As an example, additional thresholds may be used to determine a subset of the generated hyperparameter sets, such a maximum number of mapped sets to the data profile. Additionally, or alternatively, as described below with respect to FIG. 4, the hyperparameter search may be configured to return only a maximum number of hyperparameter sets and only hyperparameter sets that meet the specific additional criteria.

At step 309, process 300 may include storing hyperparameter mappings. Storing hyperparameter mappings may include sending the hyperparameter mappings to hyperparameter library 105 for storage.

Figure 4:
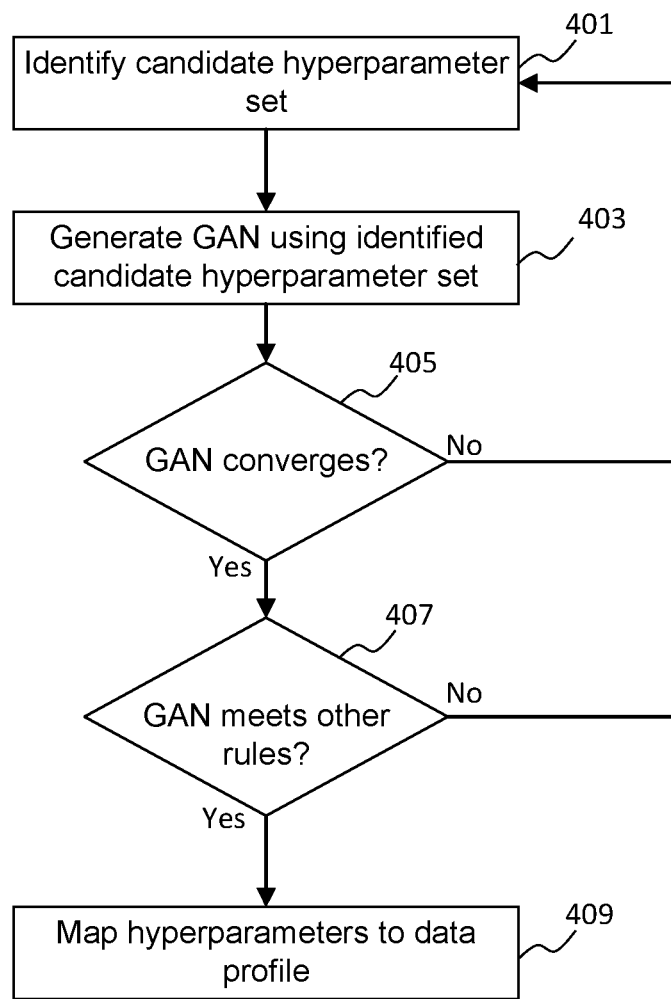
FIG. 4 is a flowchart depicting an exemplary process for generating hyperparameter mappings, consistent with disclosed embodiments.

FIG. 4 is a flowchart depicting an exemplary process 400 for generating hyperparameter mappings, consistent with disclosed embodiments. Process 400 may be executed multiple times to generate multiple hyperparameter set mappings for the same data profile. In some embodiments, process 400 may be executed repeatedly until a threshold number of mappings for a particular data profile are achieved. In such an example, repetitions of process 400 may stop when process 400 is unable to return an additional suitable hyperparameter set for mapping (i.e., a set that results in a GAN that satisfies the convergence criterion or other rules, as described below). Process 400 may be executed by one or more components of environment 100. For example, process 400 may be executed model optimizer 107, in conjunction with one or more of data profiler 103, hyperparameter library 105, computing resource 109, or storage device 111. One or more parts of process 400 may correspond to parts of process 300 of FIG. 3, for example, steps 305 and 307. Accordingly, parts of the corresponding description of process 300 may also apply to process 400.

At step 401, process 400 may include identifying a candidate hyperparameter set. For example, if the hyperparameter search is a grid search of a specified space of hyperparameters, a candidate may be a group of hyperparameters from the specified space. In some embodiments, candidate groups may be randomly selected, for example, as part of a random hyperparameter search.

At step 403, process 400 may include generating a model (i.e., a generative adversarial network ("GAN")) using the identified candidate hyperparameter set. Generating a model may include constructing a model using the hyperparameters (i.e., a generator and a discriminator) and executing the model.

At step 405, process 400 may include determining whether the generated GAN converges. If the GAN does not converge, process 400 may return back to step 401, where another candidate hyperparameter set may be identified. Determining whether a GAN converges may be performed by any suitable technique. For example, model optimizer 107 may be configured to determine the model does not converge depending on the results of the model training after a set number of epochs or indicator of failure to converge (e.g., based on the loss of the discriminator or generator, or the discriminator is always able to identify the data from the generator).

Determining whether a GAN converges may include executing the GAN multiple times and evaluating the executions against a convergence criterion. A convergence criterion may indicate, for example, a minimum number of times a model must converge out of a given number of executions. A convergence criterion may thus be used to ensure that a model is stable and will generally converge. As an example, a convergence criterion may indicate that a model should converge 9.5 out of 10 times the model is executed (i.e., the model converges at least 95% of the time). Accordingly, a model that only converges 80% of the time would not satisfy the rules and may not be used. The convergence criterion may also indicate a minimum and maximum number of test executions of the model that should be performed before the model is determined to not converge. For example, the convergence criterion requires a 90% convergence rate and the model is executed 5 times and fails to converge one of the 5 times, model optimizer 107 may determine the model does not converge. However, if the convergence criterion also indicates that the model should be executed 10 times before evaluating the criterion, the model may still satisfy the criterion and be determined to converge. Thus, step 405 may include executing the GAN multiple times and determining, based on the multiple executions of the GAN, a convergence metric for the GAN. The convergence metric may then be compared to the convergence criterion to determine if the GAN converges. If at step 405, the model is determined to converge, process 400 may proceed to step 407.

At step 407, process 400 may include determining whether the generated GAN satisfies rules within a set of rules. As an example, the set of rules may be the rules accessed at step 303 of process 300. If the GAN does not satisfy the set of rules, process 400 may return back to step 401, where another candidate hyperparameter set may be identified. As described herein, a set of rules may indicate criteria that a generated data set should satisfy. The data set may be determined to satisfy the rules, if each criterion of the rule set is met by the data set. In some embodiments, the data set may be determined to satisfy a set of rules having multiple criterion if a threshold number of the criterion is satisfied. As an example, if the set of rules has 6 rules, an associated threshold may indicate that 5 of the 6 rules should be met if a dataset produced by the GAN is to satisfy the set of rules.

As described above, rules may indicate required data distributions, minimum or maximum values for data set statistics, a data type, a content type, format, or other requirements for data sets. As an example, rules may indicate that the data set includes emails having a minimum and a maximum length. As another example, the rules may indicate that the data set includes numerical data having a certain type of distribution or statistical values (e.g., mean, standard deviations, variance, quantiles, skewness, etc.) within a defined range.

If, at step 407, the GAN is determined to satisfy the set of rules, process 400 may proceed to step 409. At step 409, process 400 may include mapping the suitable hyperparameter set (i.e., the hyperparameter set results in a model that converges and satisfies the set of rules) to a corresponding data profile. As described herein, mapping may include storing the identified hyperparameters in association with the data profile, or otherwise linking the identified hyperparameters to the data profile.

In some embodiments, mapping hyperparameter sets may also include mapping corresponding scores, such as accuracy or speed scores to the data profile and hyperparameter set mappings. Accordingly, speed scores, stability, and accuracy scores may be generated by model optimizer 107 at step 409. As described herein, a speed score may indicate the time required for a model generated with the hyperparameter set to generate a synthetic dataset of a certain size having the corresponding data profile. A speed score may also indicate a relative speed of a model, as compared to other models mapped to the same data profile. An accuracy or similarity score may indicate a relative level of similarity of generated synthetic data generated to a real or reference dataset. A convergence/stability score may indicate the stability of the model by quantifying the likelihood the model will converge, or how often the model converges. As an example, a model that always converges may be given a score of 10 out of 10, while a model that does not always converge, but converges more often than not may be assigned a score of 7. In some embodiments, the convergence score may indicate a percentage of runs during which the model generally converges (i.e., a score of 95 on a percentage based scale may indicate that the model converges on about 95% of the times it is executed).

As described herein, generating a library of hyperparameter set mappings may substantially improve the efficiency and resources required to generate a stable GAN for generating synthetic data having a certain data profile. For example, rather than running a hyperparameter search from scratch to generate hyperparameter mappings, candidate GANs may be constructed from a more limited universe of hyperparameter sets that have already been tested.

As noted above, process 400 may be run multiple times to generate multiple hyperparameter set mappings for the same data profile. In such a case, process 400 may include selecting multiple hyperparameter sets, generating a GAN for each selected set, determining whether each GAN converges and satisfies the rules, and mapping the hyperparameter sets to the data profile that converge and satisfy the rules. For example, process 400 may include selecting a first candidate hyperparameter set of a plurality of candidate hyperparameter sets and generating, using the first candidate hyperparameter set, a GAN. Process 400 may then include determining that the GAN satisfies the set of rules and returning, based on the determination, the first candidate hyperparameter set. Process 400 may then include selecting a second candidate hyperparameter set of the plurality of candidate hyperparameter sets and generating, using the second candidate hyperparameter set a second generative adversarial network. Then, substantially as performed for the first GAN, process 400 may include determining that the second GAN satisfies the set of rules; and returning, based on the determination, the second candidate hyperparameter set. The first and second candidate hyperparameter sets may then be mapped to the data profile. Of course, process 400 may include selecting other hyperparameter sets that result in GANs that do not converge or do not satisfy the set of rules. Such failing hyperparameter sets may not be mapped to the data profile.

Figure 5:
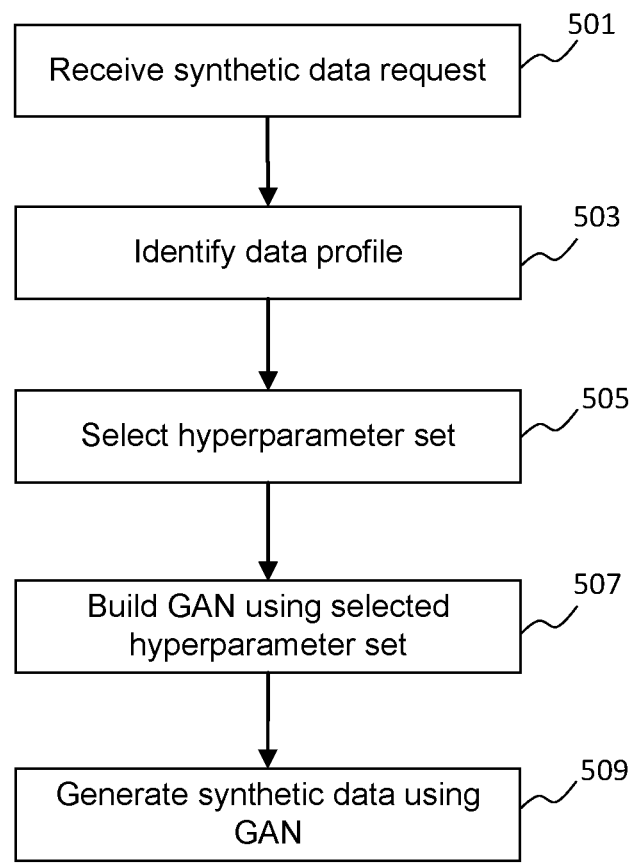
FIG. 5 is a flowchart depicting an exemplary process for generating synthetic data, consistent with disclosed embodiments.

FIG. 5 is a flowchart depicting an exemplary process 500 for generating synthetic data, consistent with disclosed embodiments. Process 500 may be executed by one or more components of environment 100. For example, process 400 may be executed by computing resource 109, in conjunction with one or more of data profiler 103, hyperparameter library 105, executed model optimizer 107, or storage device 111. One or more parts of process 500 may correspond to parts of process 300 of FIG. 3 or process 400 of FIG. 4. Accordingly, parts of the corresponding description of processes 300 and 400 may also apply to process 500.

At step 501, process 500 may include receiving a request for synthetic data. A request for synthetic data may be received from for example, a computing device associated with a user or through an interface provided to a user. In some embodiments, the request may be received from another computing resource, for example a device or virtual instance training a model and requiring synthetic data for the training. The request may include a reference dataset or a data profile for which similar synthetic data is to be generated. In some embodiments, the request may not include the data set or data profile, but may include an indication of where the data set or data profile is stored (e.g., storage device 111).

At step 503, process 500 may include identifying a data profile. If a data profile is included in the request, identifying a data profile may include accessing the data profile included in the request. In some embodiments, identifying the data profile may include retrieving the data profile from storage. For example, if the request includes an indication of a storage location of the data profile, step 503 may include accessing the storage location and retrieving the data profile.

Consistent with disclosed embodiments, identifying the data profile may include receiving the data profile for the reference data set from data profiler 103. For example where the request includes a reference data set, step 503 may include sending the reference data set to data profiler 103. Data profiler 103 may generate a data profile of the data set and send the data profile to model optimizer 107. In some embodiments, for example when the request includes an indication of a storage location of the reference data set, step 503 may include accessing the storage location, retrieving the data set, and sending the data set to data profiler 103 for profiling, and receiving the profile from data profiler 103.

At step 505, process 500 may include selecting a hyperparameter set. A hyperparameter set may be selected from the mapped hyperparameter sets, for example those stored in hyperparameter library 105. A hyperparameter set may be selected that is mapped to the data profile identified at step 503. For example, computing resource 109 may query hyperparameter library 105 for hyperparameter sets mapped to the data profile. Hyperparameter library 105 may return a hyperparameter set mapped to the data profile.

In some embodiments, a hyperparameter set may be selected based on one or more criterion related to metrics associated with the hyperparameter set mappings, such as a speed criterion, stability/convergence criterion, or accuracy criterion. Such criterion may define a minimum score that a hyperparameter set may have. Additionally, or alternatively, a criterion may indicate that the mapped hyperparameter set having the highest score is to be selected. As an example, a request may indicate that a model of relatively high speed is desired. Accordingly, a hyperparameter set may be selected by searching the hyperparameter library 105 for a hyperparameter set mapped to the data set and having a higher speed score than other sets, or having a speed score exceeding the criterion indicated by the request. As another example, the request may indicate that the most stable GAN is to be used to generate the desired synthetic data. Thus, the mapped hyperparameter set having the highest stability/convergence score may be selected.

At step 507, process 500 may include building a GAN using the selected hyperparameter set. Building a GAN may include configuring a GAN generator and discriminator using the mapped hyperparameters and training the model based on a training data set. As described herein, a training data set may be retrieved from, for example, storage device 111. In some embodiments, the data profile may be associated with a training data set. Accordingly, the training data set may be retrieved from storage device 111 based on the data profile association.

At step 509, process 500 may include generating synthetic data using the GAN. Generating synthetic data using the GAN may include executing the GAN to output synthetic data. In some embodiments, step 509 may include sending the generated data to another computing or storage device. For example, the data may be sent to a cloud storage service or virtual instance for use in training other machine learning models.

Figure 6:
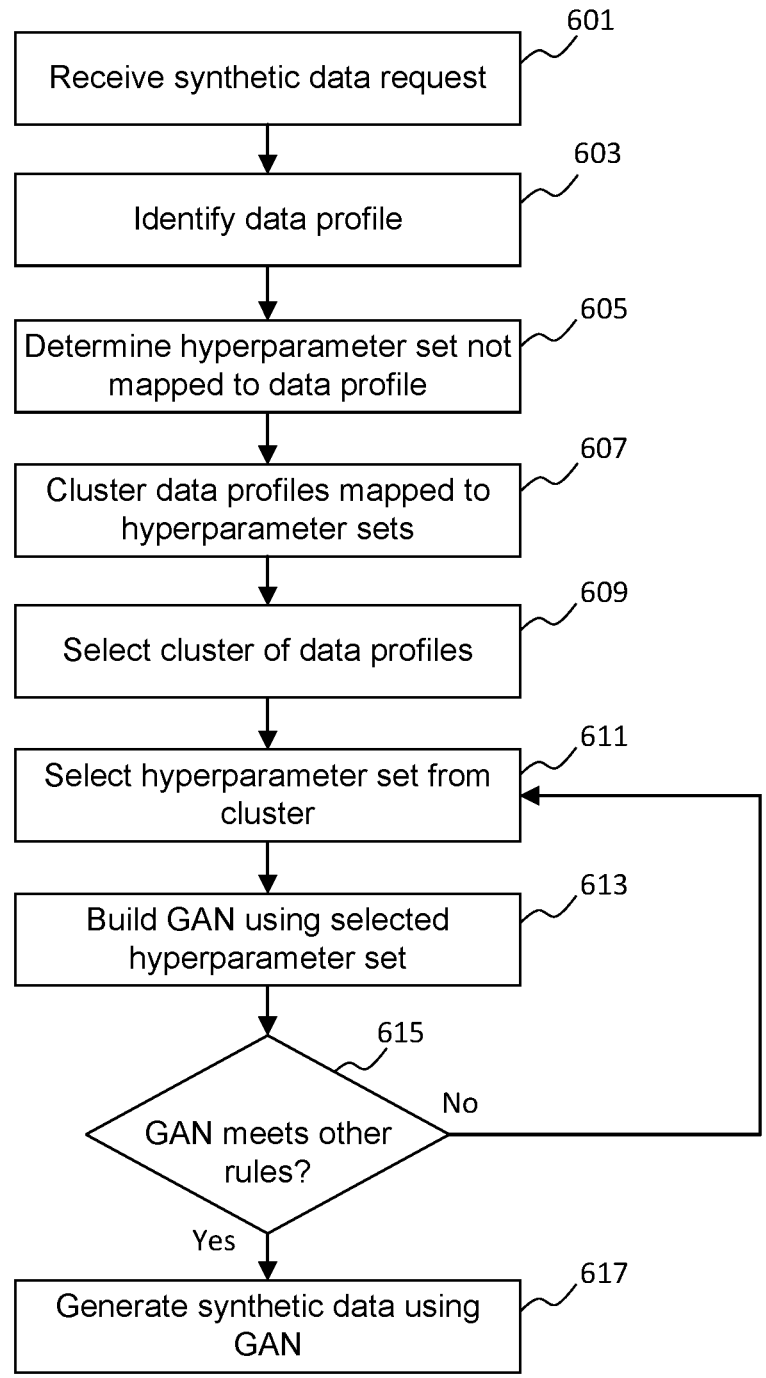
FIG. 6 is a flowchart depicting an exemplary process for generating synthetic data, consistent with disclosed embodiments

FIG. 6 is a flowchart depicting an exemplary process 600 for generating synthetic data, consistent with disclosed embodiments. Process 600 may be executed by one or more components of environment 100. For example, process 600 may be executed by computing resource 109, in conjunction with one or more of data profiler 103, hyperparameter library 105, executed model optimizer 107, or storage device 111. One or more parts of process 600 may correspond to parts of process 300 of FIG. 3, process 400 of FIG. 4, or process 500 of FIG. 5. Accordingly, parts of the corresponding description of processes 300, 400, and 500 may also apply to process 600.

At step 601, process 600 may include receiving a request for synthetic data. A request for synthetic data may be received from for example, a computing device associated with a user or through an interface provided to a user. In some embodiments, the request may be received from another computing resource, for example a device or virtual instance training a model and requiring synthetic data for the training. The request may include a reference dataset or a data profile for which similar synthetic data is to be generated. In some embodiments, the request may not include the data set or data profile, but may include an indication of where the data set or data profile is stored (e.g., storage device 111).

At step 603, process 600 may include identifying a data profile. If a data profile is included in the request, identifying a data profile may include accessing the data profile included in the request. In some embodiments, identifying the data profile may include retrieving the data profile from storage. For example, if the request includes an indication of a storage location of the data profile, step 603 may include accessing the storage location and retrieving the data profile.

Consistent with disclosed embodiments, identifying the data profile may include receiving the data profile for the reference data set from data profiler 103. For example where the request includes a reference data set, step 603 may include sending the reference data set to data profiler 103. Data profiler 103 may generate a data profile of the data set and send the data profile to model optimizer 107. In some embodiments, for example when the request includes an indication of a storage location of the reference data set, step 603 may include accessing the storage location, retrieving the data set, and sending the data set to data profiler 103 for profiling, and receiving the profile from data profiler 103.

At step 605, process 600 may include determining that the data profile is not mapped to a hyperparameter set. For example, computing resource 109 may query hyperparameter library 105 for hyperparameter set mapped to the data profile. If no hyperparameter sets are mapped to the profile, hyperparameter library 105 may not return a hyperparameter set. For example, hyperparameter library 105 may send an indication that no hyperparameter set is mapped to the data profile. In response to receiving an indication that no hyperparameter set is mapped to the data profile, computing resource 109 may proceed to step 607.

At step 607, process 600 may include clustering data profiles mapped to hyperparameter sets. Clustering data profiles may include running a machine learning algorithm to generate clusters or groupings of related data profiles. The machine learning algorithm may be a clustering algorithm such as k-means clustering, gaussian mixture model, DBSCAN, mean-shift clustering, or other suitable clustering algorithm. The clustering algorithm may be used to create clusters of similar data profiles having similar characteristics. Each of the clustered data profiles may be mapped to one or more hyperparameter sets. The data profile clusters may be sent to another device or storage location for storage, for example, hyperparameter library 105 or storage device 111. Consistent with disclosed embodiments, new data profiles not previously clustered may be input into the clustering algorithm and added to a cluster. Thus, the stored clusters may be updated over time, for example, to add new data profiles.

At step 609, process 600 may include selecting a cluster of data profiles. Selecting a cluster of data profiles may be based on similarities between the data profile identified at step 603 and the data profiles of the various clusters. For example, a cluster including data profiles having similar data types, content types, or statistical distributions may be selected. In some embodiments, the identified data profile may be provided as input to a clustering algorithm used to cluster the data profiles in step 607. Accordingly, the algorithm may place the identified into a cluster. This cluster may be selected at step 609.

At step 611, process 600 may include selecting a hyperparameter set. The hyperparameter set may be selected from the hyperparameter sets mapped to the data profiles in the selected cluster. As an example, the identified data profile may be compared to the other data profiles of the selected cluster. A hyperparameter set mapped to the most similar data profile may be selected. In some embodiments, as described herein, selecting a hyperparameter set may include querying hyperparameter library 105 for hyperparameter sets mapped to a data profile. Hyperparameter library 105 may return a hyperparameter set mapped to the data profile. Selecting a hyperparameter set based on a cluster of similar data profiles may substantially improve the efficiency and resources required to generate a stable GAN for generating synthetic data having a certain data profile. For example, rather than running a hyperparameter search from scratch to generate hyperparameter mappings, candidate GANs may be constructed from a more limited universe of hyperparameter sets. Given that these hyperparameter sets are already mapped to other similar data profiles, they may be more likely to be stable and result in successful synthetic data generation. Thus, selecting hyperparameter sets from clustered data profiles could provide significant savings in cost, resources, and time required to construct GANs for generating synthetic data.

Substantially as described above, in some embodiments, a hyperparameter set may be selected based on one or more criterion related to metrics associated with the hyperparameter set mappings, such as a speed criterion, stability/convergence criterion, or accuracy criterion. Criterion may be defined in, for example, a request for synthetic data. Such criterion may define a minimum score that a hyperparameter set may have. Additionally, or alternatively, a criterion may indicate that the mapped hyperparameter set having the highest score is to be selected. As an example, a request may indicate that a model of relatively high speed is desired. Accordingly, a hyperparameter set may be selected by searching the hyperparameter library 105 for a hyperparameter set mapped to the data set and having a higher speed score than other sets, or having a speed score exceeding the criterion indicated by the request. As another example, the request may indicate that the most stable GAN is to be used to generate the desired synthetic data. Thus, the mapped hyperparameter set having the highest stability/convergence score may be selected.

At step 613, process 600 may include building a GAN using the selected hyperparameter set. Building a GAN may include configuring a GAN generator and discriminator using the mapped hyperparameters and training the model based on a training data set. As described herein, a training data set may be retrieved from, for example, storage device 111. In some embodiments, the data profile may be associated with a training data set. Accordingly, the training data set may be retrieved from storage device 111 based on the data profile association.

At step 615, process 600 may include determining whether the generated GAN satisfies rules within a set of rules. As an example, the set of rules may be rules related to the data profile identified at step 603. If the GAN does not satisfy the set of rules, process 600 may return back to step 611, where another hyperparameter set may be identified.

As described herein, a set of rules may indicate criteria that a generated data set should satisfy. The data set may be determined to satisfy the rules, if each criterion of the rule set is met by the data set. In some embodiments, the data set may be determined to satisfy a set of rules having multiple criterion if a threshold number of the criterion is satisfied. As an example, if the set of rules has 6 rules, an associated threshold may indicate that 5 of the 6 rules should be met if a dataset produced by the GAN is to satisfy the set of rules. As described above, rules may indicate required data distributions, minimum or maximum values for data set statistics, a data type, a content type, format, or other requirements for data sets. As an example, rules may indicate that the data set includes emails having a minimum and a maximum length. As another example, the rules may indicate that the data set includes numerical data having a certain type of distribution or statistical values (e.g., mean, standard deviations, variance, quantiles, skewness, etc.) within a defined range.

If, at step 615, the GAN is determined to satisfy the set of rules, process 600 may proceed to step 617. In some embodiments, when the GAN satisfies the rules, step 615 may include mapping the hyperparameter set (i.e., the hyperparameter set results in a model that converges and satisfies the set of rules) to the data profile identified in step 603. As described herein, mapping may include storing the identified hyperparameters in association with the data profile, or otherwise linking the identified hyperparameters to the data profile.

In some embodiments, mapping hyperparameter sets may also include mapping corresponding scores, such as accuracy or speed scores to the data profile and hyperparameter set mappings. Accordingly, speed scores, stability, and accuracy scores may be generated by model optimizer 107 at step 613 or 615. As described herein, a speed score may indicate the time required for a model generated with the hyperparameter set to generate a synthetic dataset of a certain size having the corresponding data profile. A speed score may also indicate a relative speed of a model, as compared to other models mapped to the same data profile. An accuracy or similarity score may indicate a relative level of similarity of generated synthetic data generated to a real or reference dataset. A convergence/stability score may indicate the stability of the model by quantifying the likelihood the model will converge, or how often the model converges. As an example, a model that always converges may be given a score of 10 out of 10, while a model that does not always converge, but converges more often than not may be assigned a score of 7. In some embodiments, the convergence score may indicate a percentage of runs during which the model generally converges (i.e., a score of 95 on a percentage based scale may indicate that the model converges on about 95% of the times it is executed).

Consistent with disclosed embodiments, parts of process 600 may be run multiple times to generate multiple hyperparameter set mappings for the same data profile. For example, steps 611 through 615 may be run multiple times to determine multiple suitable hyperparameter sets.

At step 617, process 600 may include generating synthetic data using the GAN. Generating synthetic data using the GAN may include executing the GAN to output synthetic data. In some embodiments, step 617 may include sending the generated data to another computing or storage device. For example, the data may be sent to a cloud storage service or virtual instance for use in training other machine learning models.

Another aspect of the disclosure is directed to a non-transitory computer-readable medium storing instructions that, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

As used herein, the indefinite articles "a" and "an" mean "one or more" unless it is unambiguous in the given context. Similarly, the use of a plural term does not necessarily denote a plurality unless it is unambiguous in the given context. As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

It will be apparent to those skilled in the art that various modifications and variations can be made to the disclosed system and related methods. Other embodiments will be apparent to those skilled in the art from consideration of the specification and practice of the disclosed system and related methods. It is intended that the specification and examples be considered as exemplary only, with a true scope being indicated by the following claims and their equivalents.

What is claimed is:

1. A system for generating synthetic data, comprising:
   at least one memory storing instructions; and
   at least one processor configured to execute the instructions to perform operations comprising:
   retrieving a set of rules associated with a first data profile;
   generating, by executing a hyperparameter search, a plurality of hyperparameter sets for generative adversarial networks, the hyperparameter sets corresponding to generative adversarial networks that satisfy the set of rules, the generation including:
   selecting a first candidate hyperparameter set of a plurality of candidate hyperparameter sets;
   generating, using the first candidate hyperparameter set, a first generative adversarial network;
   determining that the first generative adversarial network satisfies the set of rules;
   returning, based on the determination that the first generative adversarial network satisfies the set of rules, the first candidate hyperparameter set;
   selecting a second candidate hyperparameter set of the plurality of candidate hyperparameter sets;
   generating using the second candidate hyperparameter set a second generative adversarial network;
   determining that the second generative adversarial network satisfies the set of rules; and
   returning, based on the determination that the second generative adversarial network satisfies the set of rules, the second candidate hyperparameter set;
   generating first mappings between the plurality of generated hyperparameter sets and the first data profile;
   storing the first mappings in a hyperparameter library, the hyperparameter library storing a plurality of mappings of hyperparameter sets to a plurality of data profiles;
   receiving a request for synthetic data, the request indicating a second data profile;
   selecting, from the plurality of mappings in the hyperparameter library, a hyperparameter set mapped to the second data profile;
   building a third generative adversarial network using the selected hyperparameter set mapped to the second data profile; and
   generating, using the third generative adversarial network, a synthetic data set.

2. The system of claim 1, wherein generating the first mappings comprises mapping the first and second candidate hyperparameter sets to the first data profile.

3. The system of claim 1, wherein determining that the first or second generative adversarial network satisfies the set of rules comprises:
   executing the first or second generative adversarial network multiple times to generate a plurality of synthetic data sets;
   comparing the plurality of synthetic data sets to a reference data set; and
   determining, based on the comparing, an accuracy metric for the first or generative adversarial network.

4. The system of claim 1, wherein determining that the first or second generative adversarial network satisfies the set of rules comprises determining that an accuracy metric satisfies an accuracy criterion.

5. The system of claim 1, wherein the set of rules comprises a convergence criterion.

6. The system of claim 5, wherein determining that the first or second generative adversarial network satisfies the set of rules comprises:
   executing the first or second generative adversarial network multiple times to generate a plurality of synthetic data sets; and determining, based on multiple executions of the first or second generative adversarial network, a convergence metric for the first or second generative adversarial network.

7. The system of claim 6, the operations further comprising:
comparing the convergence metric to a convergence criterion; and
determining based on the comparison, that the first or second generative adversarial network converges.

8. The system of claim 1, wherein the first data profile and the second data profile are the same data profile.

9. The system of claim 1, wherein retrieving the set of rules comprises accessing the first data profile.

10. The system of claim 9, wherein accessing the first data profile comprises generating the first data profile for a dataset and generating the set of rules associated with the first data profile.

11. The system of claim 1, wherein the hyperparameter search comprises at least one of: a random search, Bayesian optimization, gradient-based optimization, or a grid search.

12. A method for generating synthetic data, comprising:
retrieving a set of rules associated with a first data profile;
generating, by executing a hyperparameter search, a plurality of hyperparameter sets for generative adversarial networks, the hyperparameter sets corresponding to generative adversarial networks that satisfy the set of rules, the generation including:
selecting a first candidate hyperparameter set of a plurality of candidate hyperparameter sets;
generating, using the first candidate hyperparameter set, a first generative adversarial network;
determining that the first generative adversarial network satisfies the set of rules;
returning, based on the determination that the first generative adversarial network satisfies the set of rules, the first candidate hyperparameter set;
selecting a second candidate hyperparameter set of the plurality of candidate hyperparameter sets;
generating, using the second candidate hyperparameter set a second generative adversarial network;
determining that the second generative adversarial network satisfies the set of rules; and
returning, based on the determination that the second generative adversarial network satisfies the set of rules, the second candidate hyperparameter set:
generating mappings between the plurality of hyperparameter sets and the first data profile;
storing the mappings in a hyperparameter library, the hyperparameter library storing a plurality of mappings of hyperparameter sets to a plurality of data profiles;
receiving a request for synthetic data, the request indicating a second data profile;
selecting, based on the second data profile and from the plurality of mappings in the hyperparameter library, a hyperparameter set;
building a third generative adversarial network using the selected hyperparameter set based on the second data profile; and
generating, using the third generative adversarial network, a synthetic data set.

13. The method of claim 12, wherein receiving a request for synthetic data comprises receiving a reference dataset.

14. The method of claim 13, further comprising generating a profile for the reference dataset, wherein the generated profile comprises the second data profile.

15. The method of claim 12, wherein selecting, based on the second data profile and from the plurality of mappings in the hyperparameter library, a hyperparameter set comprises selecting a hyperparameter set mapped to the second data profile.

16. The method of claim 12, further comprising:
determining that the second data profile is not mapped to a hyperparameter set in the hyperparameter library; and
identifying a third data profile similar to the second data profile, the third data profile being mapped to a hyperparameter set in the hyperparameter library, wherein the selected hyperparameter set is mapped to the third data profile.

17. The method of claim 12, wherein the set of rules indicates a desired data distribution.

18. The method of claim 12, wherein the hyperparameter search comprises a grid search.

19. The method of claim 12, wherein the hyperparameter search comprises a random search.

20. A non-transitory computer readable medium including instructions that, when executed by at least one processor, cause the at least one processor to perform operations for generating synthetic data, the operations comprising:
retrieving a set of rules associated with a first data profile;
generating, by executing a hyperparameter search, a plurality of hyperparameter sets for generative adversarial networks, the hyperparameter sets corresponding to generative adversarial networks that satisfy the set of rules, the generation including:
selecting a first candidate hyperparameter set of a plurality of candidate hyperparameter sets;
generating, using the first candidate hyperparameter set, a first generative adversarial network;
determining that the first generative adversarial network satisfies the set of rules;
returning, based on the determination that the first generative adversarial network satisfies the set of rules, the first candidate hyperparameter set;
selecting a second candidate hyperparameter set of the plurality of candidate hyperparameter sets;
generating using the second candidate hyperparameter set a second generative adversarial network;
determining that the second generative adversarial network satisfies the set of rules; and
returning, based on the determination that the second generative adversarial network satisfies the set of rules, the second candidate hyperparameter set;
generating mappings between the plurality of generated hyperparameter sets and the first data profile;
storing the mappings in a hyperparameter library, the hyperparameter library storing a plurality of mappings of hyperparameter sets to a plurality of data profiles;
receiving a request for synthetic data, the request including a reference data set having a characteristic;
generating, based on the reference data set, a second data profile, the second data profile being the same as the first data profile;
selecting, based on the second data profile and from the plurality of mappings in the hyperparameter library, a hyperparameter set;
building a third generative adversarial network using the selected hyperparameter set based on the second data profile; and
generating, using the third generative adversarial network, a synthetic data set having the characteristic of the reference dataset.

* * * * *